United States Patent [19]

Hall

[11] Patent Number: 5,596,908
[45] Date of Patent: Jan. 28, 1997

[54] LOCK FOR SLIDE AND LOCK L-ARM

[75] Inventor: Michael Hall, Ortonville, Mich.

[73] Assignee: Teleflex Incorporated, Plymouth Meeting, Pa.

[21] Appl. No.: 519,775

[22] Filed: Aug. 28, 1995

[51] Int. Cl.⁶ ............................. F16C 1/14; F16G 11/00
[52] U.S. Cl. ......................... 74/502.4; 24/702; 24/589
[58] Field of Search ..................... 74/502.4, 502.6; 248/56, 71, 224.8; 403/243, 260; 24/702, 589

[56] References Cited

U.S. PATENT DOCUMENTS

| | | |
|---|---|---|
| 4,339,213 | 7/1982 | Gilmore ........................... 74/502.4 X |
| 4,763,541 | 8/1988 | Spease . |
| 4,829,845 | 5/1989 | Suzuki .................................. 74/502.4 |
| 4,951,524 | 8/1990 | Niskanen ............................. 74/502.4 |
| 5,272,934 | 12/1993 | Chegash et al. . |
| 5,280,733 | 1/1994 | Reasoner ............................. 74/502.4 |
| 5,461,938 | 10/1995 | Froling et al. ....................... 74/502.4 |

Primary Examiner—Charles A. Marmor
Assistant Examiner—Mary Ann Battista
Attorney, Agent, or Firm—Howard & Howard

[57] ABSTRACT

The remote control assembly (10) includes a fitting (16) characterized by a U-shaped lock (40) supported on the fitting (16) for movement between an unlocked position, to allow movement of the L-shaped arm (32) to a deflected position, and a locked position, to prevent the projection (34) on the L-shaped arm (32) from moving out of gripping engagement with the hole (38) in the bulkhead.

14 Claims, 3 Drawing Sheets

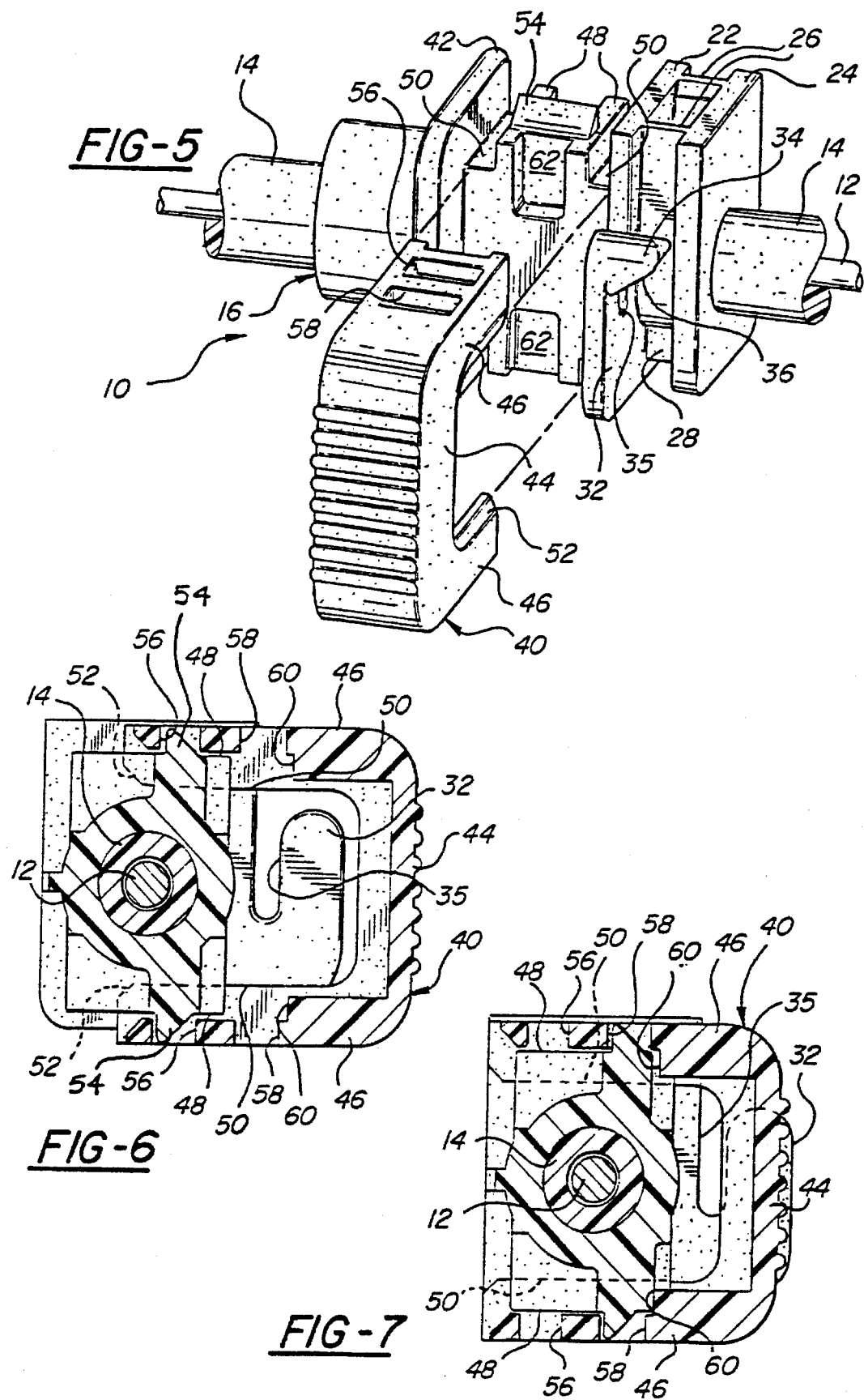

5,596,908

LOCK FOR SLIDE AND LOCK L-ARM

TECHNICAL FIELD

The subject invention relates to a motion transmitting remote control assembly of the type for transmitting motion in a curved path by a flexible motion transmitting core element movably supported in a guide such as a conduit. More specifically, the invention relates to a guide including an end fitting and a conduit wherein the end fitting is retained in a U-shaped seat in a bulkhead.

BACKGROUND ART

Prior art remote control assemblies have included a conduit supported in a U-shaped seat in a bulkhead by a ferrule or support fitting. Such a fitting have also included an extension or L-shaped arm with a projection at the distal end for snapping into a hole in the bulkhead to retain the fitting in the U-shaped seat. Such an assembly is disclosed in U.S. Pat. No. 4,763,541 to Spease and assigned to the assignee of the subject invention. An improvement, also assigned to the assignee hereof, is disclosed in U.S. Pat. No. 5,272,934 to Chegash et al, wherein there is a back stop to limit the flexing movement of the L-shaped arm thereby preventing excess bending and/or breaking of the L-shaped arm. In some environments, however, the L-arm undesirably flexes out of engagement with the hole in the bulkhead, allowing removal of the fitting from the U-shaped seat. In yet other assemblies, a separate lock or a lock tethered to the assembly are utilized but are susceptible to inadvertent detachment and loss during shipping.

SUMMARY OF THE INVENTION

A motion transmitting remote control assembly of the type for transmitting forces along a curved path by a motion transmitting core element movably supported by a guide means having first and second ends and a bore therethrough defining a first axis for extending through and supported in a substantially the U-shaped seat in a bulkhead. An abutment means positions the guide means in the U-shaped seat and a gripping means is disposed laterally from the abutment means and from the guide means for gripping engagement with the bulkhead to prevent the guide means from moving out of the U-shaped seat, the gripping means being movable to a deflected position out of gripping engagement with the bulkhead for installation of the abutment means into the U-shaped seat. The assembly is characterized by a lock slidably supported on the guide means for movement between an unlocked position to allow movement of the gripping means to the deflected position, and a locked position to prevent the gripping means from moving out of gripping engagement with the bulkhead.

BRIEF DESCRIPTION OF THE DRAWINGS

Other advantages of the present invention will become readily appreciated as the same becomes better understood by reference to the following detailed description when considered in connection with the accompanying drawings wherein:

FIG. 5 is a perspective view from a different angle showing the preferred embodiment in the pre-assembled position;

FIG. 6 is a cross-sectional view taken substantially along line 6—6 of FIG. 3 showing the unlocked position; and FIG. 7 is a cross-sectional view taken substantially along line 7—7 of FIG. 4 showing the locked position.

DETAILED DESCRIPTION OF PREFERRED EMBODIMENT

Figure 1:
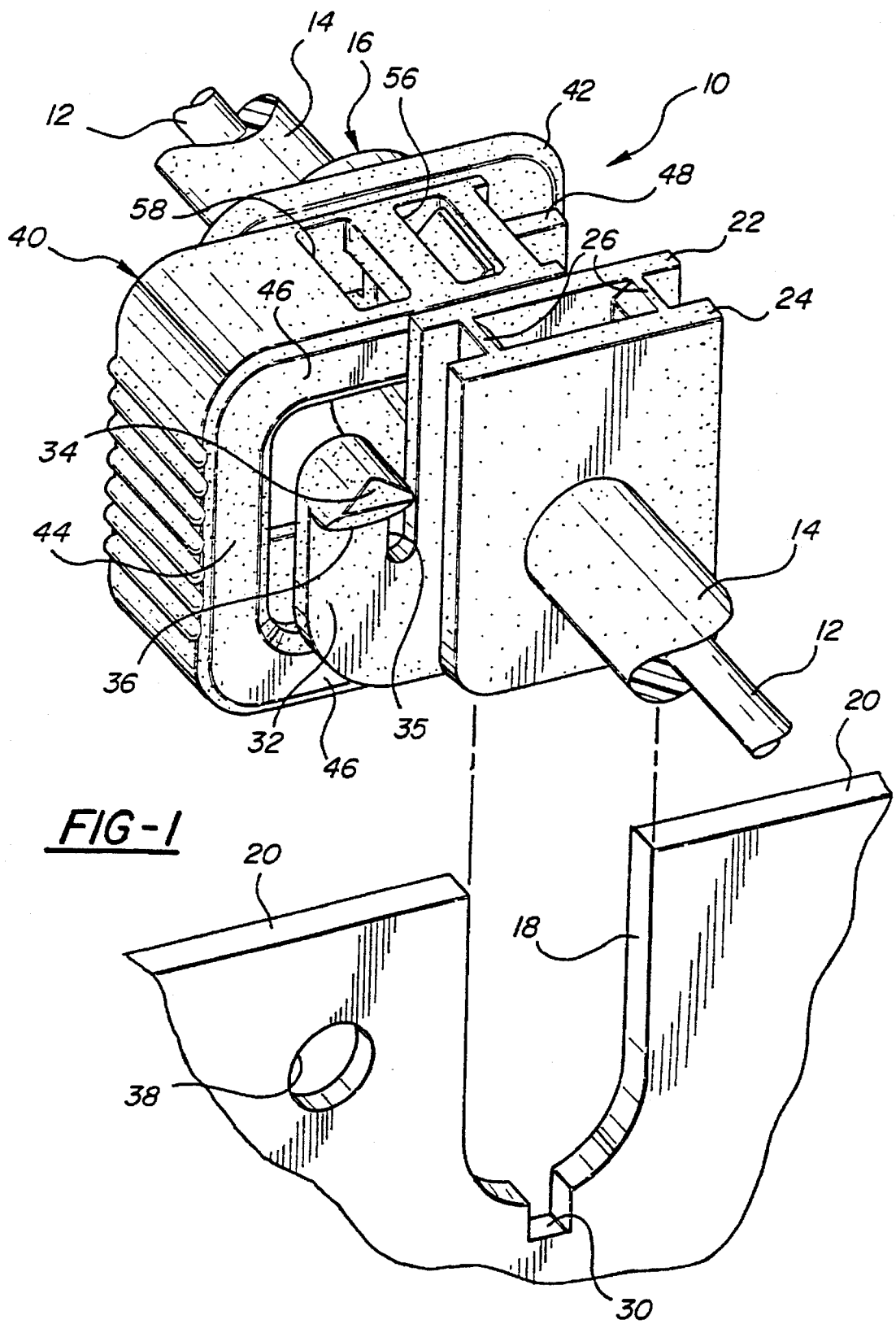
FIG. 1 is a fragmentary perspective view of a preferred embodiment of the subject invention.
Figure 2:
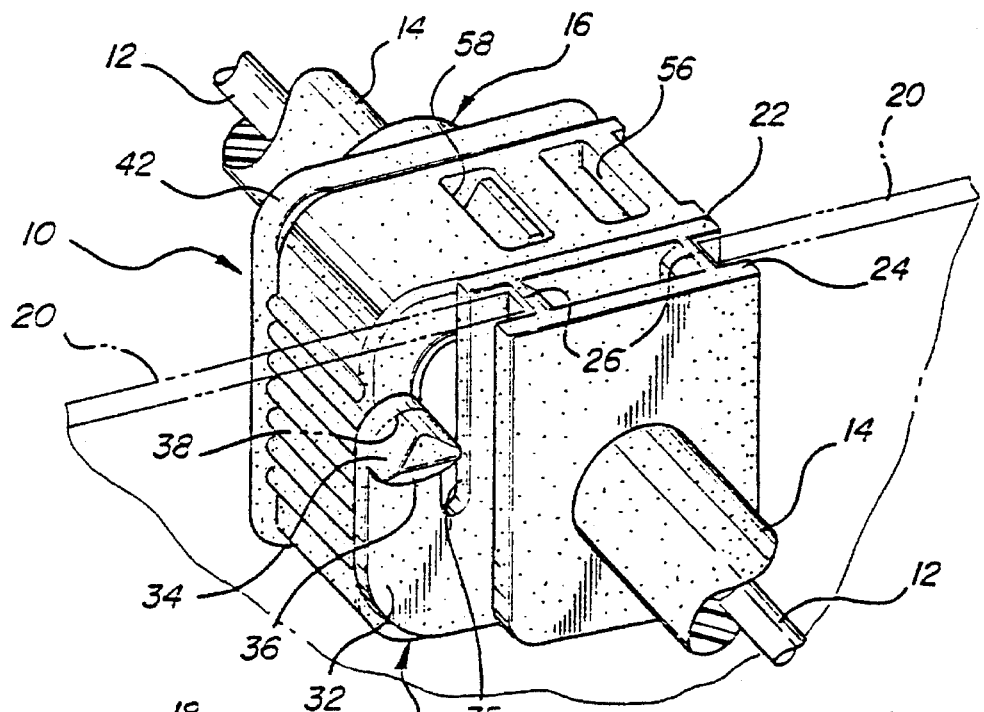
FIG. 2 is a perspective view similar to FIG. 1 but shown supported in a U-shaped seat in a bulkhead, which is shown in phantom.

A motion transmitting remote control assembly is generally shown at 10 and is of the type for transmitting forces along a curved path by a motion transmitting core element 12. The core element 12 is movably supported in a conduit 14, the conduit 14 being of the type well known in the art comprising an inner tubular plastic member surrounded by long lay wires and an outer extruded plastic casing. A fitting, generally indicated at 16, and of rigid plastic material, is disposed on the conduit 14 for being supported in a U-shaped seat 18 in a bulkhead 20. The conduit 14 and the fitting 16 comprise a guide means having first and second ends and a bore therethrough defining a first axis for extending through the U-shaped seat 18. The core element 12 is slidably supported in the bore in the guide means for transmitting motion between the ends of the guide means.

The fitting 16 includes abutment means for positioning said guide means in the U-shaped seat 18. The abutment means includes inner 22 and outer 24 spaced flanges for abutting engagement with the bulkhead 20 therebetween to prevent axial movement of the fitting 16 of the guide means relative to the bulkhead 20. The flanges 22 and 24 are interconnected by center web 26 which seats against the edge or sides of the U-shaped seat 18 as inner 22 and outer 24 flanges sandwich the bulkhead therebetween. A guide web 28 extends from the bottom of the center web 26 and between the inner and outer flanges 22 and 24 for sliding insertion into the notch 30 in the bottom of the U-shaped seat 18 to further retain the fitting 16 seated in the U-shaped seat 18.

Figure 3:
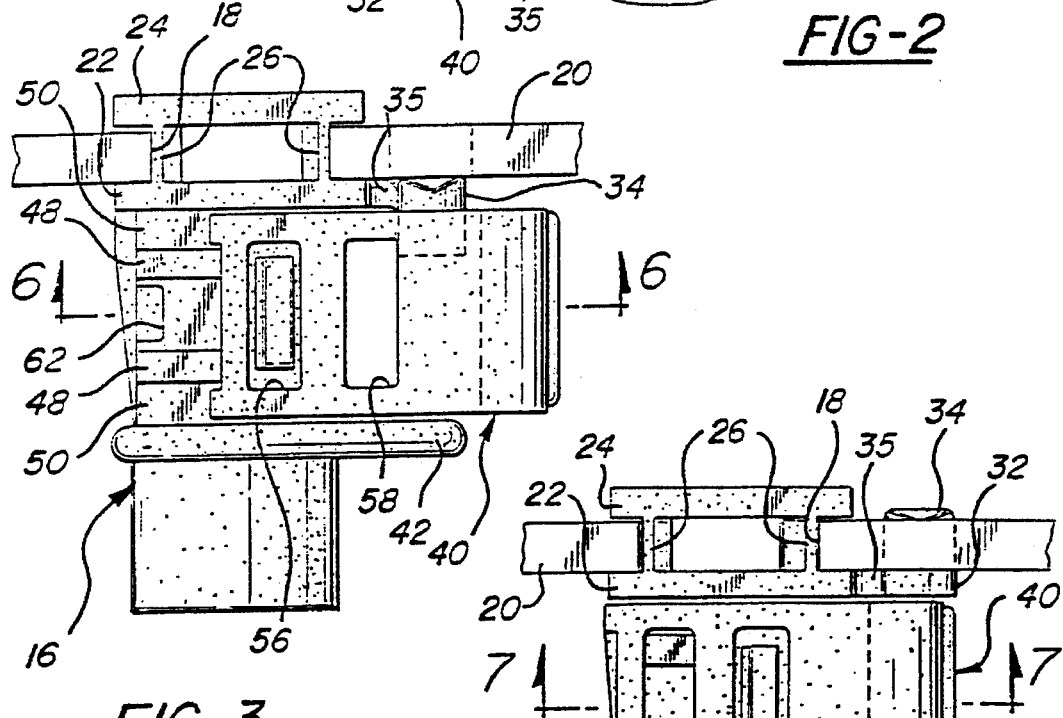
FIG. 3 is a top view of the embodiment of FIGS. 1 in the assembled and unlocked position.

A gripping means, defined by an extension 32 and a projection 34, is disposed and spaced laterally from the inner flange 22 of the abutment means by a slot 35 and, therefore, laterally from the guide means for gripping engagement with the bulkhead to prevent the guide means from moving out of the U-shaped seat 18. The gripping means is movable to a deflected position out of gripping engagement with the bulkhead, as shown in FIG. 3, for installation of the abutment means into the U-shaped seat. More specifically, the extension 32 extends laterally from and generally co-planar with the inner flange 22 and is defined by an L-shaped arm extending laterally and then parallel and spaced from the inner flange 22 to a distal end, the gripping projection 34 being disposed on that distal end. The bulkhead 20 has an opening or a hole 38 for receiving the gripping projection 34 and the gripping projection 34 presents a beveled or slanted end 36 for ramping up and over the edge of the bulkhead during installation into the U-shaped seat, at which position the projection 34 drops into the hole 38. In other words, the gripping means includes a projection 34 extending axially from the extension 32 for disposition in the 38 hole in the bulkhead 20.

The assembly 10 is characterized by a lock, generally indicated at 40, slidably supported on the fitting 16 of the guide means for movement between an unlocked position to allow movement of the L-shaped arm 32 of the gripping means to the deflected position, as shown in FIG. 3, and a locked position to prevent the gripping projection 34 of the gripping means from moving out of gripping engagement with the hole 38 in the bulkhead 20.

The fitting 16 of the guide means includes a saddle flange 42 spaced axially from the inner flange 22 to define a saddle section therebetween. In other words, the guide means presents a saddle section adjacent the inner flange 22 for supporting the lock 40.

Figure 4:
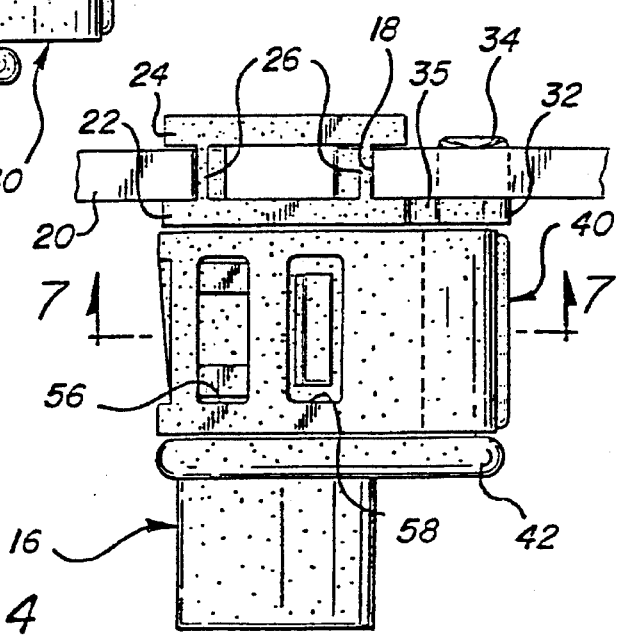
FIG. 4 is a top view like FIG. 3 but showing the preferred embodiment in the locked position.

The lock 40 comprises a U-shaped element having a base 44 and spaced legs 46. The base 44 is positioned behind the L-shaped arm 32 of the gripping means in the locked position to prevent movement of the projection 34 of the gripping means out of the locked position in the hole 38, as shown in FIG. 4. The saddle section includes first and second leg engaging extremities 48 which are parallel to one another for guiding movement of the legs 46 of the lock 40 between the locked and unlocked positions. Each of the leg engaging extremities 48 includes a groove 50 adjacent each of the inner flange 22 and the saddle flange 42. Each of the legs 46 includes a complementary pair of rails 52 in sliding engagement with the grooves 50.

In addition, a first detent means is included for releasably holding the lock in the unlocked position as well as a second detent means for releasably holding the lock 40 in the locked position. More specifically, the first and second detent means includes a detent tab or ramp 54 extending upwardly from each of the leg engaging extremities 48 and a pair of spaced detent openings 56 and 58 in each of the legs 46 for establishing the locked and unlocked positions. The base 44 and legs 46 of the lock 40 presents an open space behind the gripping projection 34 on the L-shaped arm 32 of the gripping means when in the unlocked position.

Each leg 46 also includes a rib 60 extending from the base 44 to an end disposed adjacent the locking opening 58 for engaging the bottom wall 62 of a recess disposed immediately below each of the detent tabs 54. The engagement of the ribs 60 with the bottoms 62 of the recesses in the fitting 16 provides a limit to the inward movement of the lock 40 onto the fitting 16.

During shipping, the detent tab 54 is disposed in the detent openings 56 of the legs 46. During installation, the fitting 16 is slid into the seat 18 as the edges of the seat 18 slide in the grooves defined between the inner 22 and outer 24 flanges until seated therein with the guide web 28 is disposed in the notch 30 in the bulkhead. As this movement occurs, the L-shaped arm 32 flexes out of co-planer alignment with the inner flange 22 to allow the gripping projection 34 to ride up and over the surface of the bulkhead 20 until the projection 34 drops into the hole 38. The L-shaped arm 32 is allowed to flex into the space inside the U-shape between the legs 46 and the base 44 of the lock element 40. Once the gripping projection 34 is in the hole 38, the L-shaped arm 32 returns to the co-planer position relative to the inner flange 22. The assembly is installed and may be locked in the installed position by moving the lock 40 to the locked position wherein the detent tab or ramp 54 is disposed in the second detent opening 58, in which position the base 44 of the lock 40 is disposed behind the L-shaped arm 32 to prevent the arm 32 from flexing out to thereby prevent the gripping projection from moving out of the hole 38.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A motion transmitting remote control assembly for transmitting forces along a curved path and being supported in a substantially U-shaped seat in a bulkhead, said assembly comprising:

guide means having first and second ends and a bore therethrough defining a first axis for extending through the U-shaped seat;

a core element movably supported in said bore in said guide means for transmitting motion between said ends of said guide means;

abutment means for positioning said guide means in the U-shaped seat;

gripping means disposed laterally from said abutment means and from said guide means for gripping engagement with the bulkhead to prevent said guide means from moving out of the U-shaped seat, said gripping means being axially movable to a deflected position out of gripping engagement with the bulkhead for installation of said abutment means into the U-shaped seat; and characterized by a lock slidably supported on said guide means for movement transversely to said axis between an unlocked position to allow axial movement of said gripping means to said deflected position and a locked position to engage and thereby prevent said gripping means from moving axially out of gripping engagement with the bulkhead.

2. An assembly as set forth in claim 1 including first detent means for releasably holding said lock in said unlocked position.

3. An assembly as set forth in claim 2 including second detent means for releasably holding said lock in said locked position.

4. An assembly as set forth in claim 3 wherein said abutment means includes inner and outer spaced flanges for abutting engagement with the bulkhead therebetween to prevent axial movement of said guide means relative to the bulkhead.

5. An assembly as set forth in claim 4 wherein said guide means presents a saddle section adjacent said inner flange for supporting said lock.

6. An assembly as set forth in claim 5 wherein said gripping means includes an extension extending laterally from and generally co-planar with said inner flange.

7. An assembly as set forth in claim 6 wherein said guide means includes a saddle flange spaced axially from said inner flange to define said saddle section therebetween.

8. An assembly as set forth in claim 7 wherein said lock comprises a U-shaped element having a base and spaced legs, said base being positioned behind said gripping means in said locked position to prevent movement of said gripping means out of said locked position.

9. An assembly as set forth in claim 8 wherein said saddle section includes first and second leg engaging extremities which are parallel to one another for guiding movement of said legs of said lock between said locked and unlocked positions.

10. An assembly as set forth in claim 9 wherein said first and second detent means includes a detent tab extending upwardly from each of said leg engaging extremities and a pair of spaced detent openings in each of said legs of said lock for establishing said locked and unlocked positions, said base and said legs of said lock presenting an open space behind said gripping means when in said unlocked position.

11. An assembly as set forth in claim 10 wherein each of said leg engaging extremities includes a groove adjacent each of said inner flange and said saddle flange, and each of said legs of said lock includes a pair of rails in sliding engagement with said grooves.

12. An assembly as set forth in claim 11 wherein said gripping means includes a projection extending axially from said extension for disposition in a hole in the bulkhead.

13. An assembly as set forth in claim 12 wherein said extension comprises an L-shaped arm extending laterally and then parallel and spaced from said inner flange to a distal end, said gripping projection being disposed on said distal end.

14. An assembly as set forth in 12 wherein said guide means includes a conduit supporting said core element, said abutment means and said saddle section being defined by a fitting disposed about said conduit.

* * * * *